(12) United States Patent
Ewald

(10) Patent No.: US 8,640,651 B2
(45) Date of Patent: Feb. 4, 2014

(54) ARTIFICIAL FISH HABITAT EMPLOYING FISH HIDING UNITS

(76) Inventor: David W. Ewald, Wonder Lake, IL (US)

( * ) Notice: Subject to any disclaimer, the term of this patent is extended or adjusted under 35 U.S.C. 154(b) by 174 days.

(21) Appl. No.: 12/565,858

(22) Filed: Sep. 24, 2009

(65) Prior Publication Data

US 2011/0067642 A1    Mar. 24, 2011

(51) Int. Cl.
    *A01K 61/00*    (2006.01)
(52) U.S. Cl.
    USPC ............................................. 119/221
(58) Field of Classification Search
    USPC ......... 119/208, 210, 215, 219, 221, 238, 245, 119/256, 796, 41.13, 41.1; 52/296, 297; 47/41.13, 41.1
    See application file for complete search history.

(56) References Cited

U.S. PATENT DOCUMENTS

| | | | |
|---|---|---|---|
| 598,076 A * | 2/1898 | Case ................................. 405/21 |
| 649,874 A * | 5/1900 | Payne ............................ 47/41.11 |
| 1,555,475 A * | 9/1925 | Maunz .............................. 428/22 |
| 2,624,968 A * | 1/1953 | Polizzi .............................. 47/55 |
| 3,323,310 A * | 6/1967 | Arpin .............................. 405/24 |
| 3,522,793 A | 8/1970 | Proewig |
| 3,929,100 A | 12/1975 | Thomas et al. |
| 3,933,124 A | 1/1976 | Ledoux et al. |
| 4,095,560 A | 6/1978 | Laurie et al. |
| 4,185,743 A * | 1/1980 | Willinger ....................... 206/423 |
| 4,329,826 A * | 5/1982 | Flogaus et al. .................. 52/712 |
| 4,395,970 A | 8/1983 | Kunkle et al. |
| 4,441,453 A | 4/1984 | McMickle et al. |
| 4,478,533 A * | 10/1984 | Garrett ............................ 405/24 |
| 4,550,518 A | 11/1985 | Layson |
| 4,736,708 A | 4/1988 | Yoder |
| 4,903,636 A | 2/1990 | Kroeker |
| 5,007,377 A | 4/1991 | Muench, Jr. |
| 5,042,424 A | 8/1991 | Hense |
| 5,069,579 A * | 12/1991 | Burns ............................. 405/25 |
| 5,109,796 A | 5/1992 | Monus |
| 5,163,967 A * | 11/1992 | Hoffman et al. ................ 52/299 |
| 5,201,136 A | 4/1993 | LaMorte et al. |
| 5,213,058 A | 5/1993 | Parker et al. |
| 5,272,829 A | 12/1993 | Roberts et al. |
| 5,315,779 A | 5/1994 | Fussell |
| 5,603,189 A | 2/1997 | Levy |
| 5,669,330 A | 9/1997 | O'Hare |
| 5,860,392 A | 1/1999 | Jahren |
| 5,884,585 A | 3/1999 | Streichenberger |
| 5,961,251 A * | 10/1999 | Prendergast .................... 405/24 |
| 5,970,917 A | 10/1999 | Keith, Jr. |
| 6,089,191 A | 7/2000 | Calinski et al. |
| 6,244,218 B1 * | 6/2001 | McNeil ......................... 119/223 |
| 6,276,301 B1 | 8/2001 | Pederson |
| 6,325,569 B1 | 12/2001 | Streichenberger |
| 6,343,567 B1 * | 2/2002 | McNeil et al. ................ 119/256 |
| 6,408,791 B1 | 6/2002 | O'Dell |
| 6,668,756 B1 | 12/2003 | Favorito |
| 6,896,445 B1 | 5/2005 | Engler |
| 6,978,735 B1 | 12/2005 | Yeager |
| 7,043,875 B1 * | 5/2006 | Neuner ........................ 47/41.15 |

(Continued)

*Primary Examiner* — Rob Swiatek
*Assistant Examiner* — Ebony Evans
(74) *Attorney, Agent, or Firm* — Michael D. Eisenberg

(57) ABSTRACT

Fish hiding units are discloses herein, which may comprise a sinkable container comprising at least one open end; a plurality of elongated and substantially flat projection members comprising a body and opposing ends inserted at one end into the open end of the container; and an adhesive substance disposed in the container for attaching the projection members inside the container.

9 Claims, 4 Drawing Sheets

(56) References Cited

U.S. PATENT DOCUMENTS

| | | | |
|---|---|---|---|
| D625,471 S * | 10/2010 | King | D30/106 |
| 7,828,493 B1 * | 11/2010 | Brignac | 405/24 |
| 2001/0029694 A1 | 10/2001 | Bodden | |
| 2003/0177982 A1 | 9/2003 | Jenkins | |

\* cited by examiner

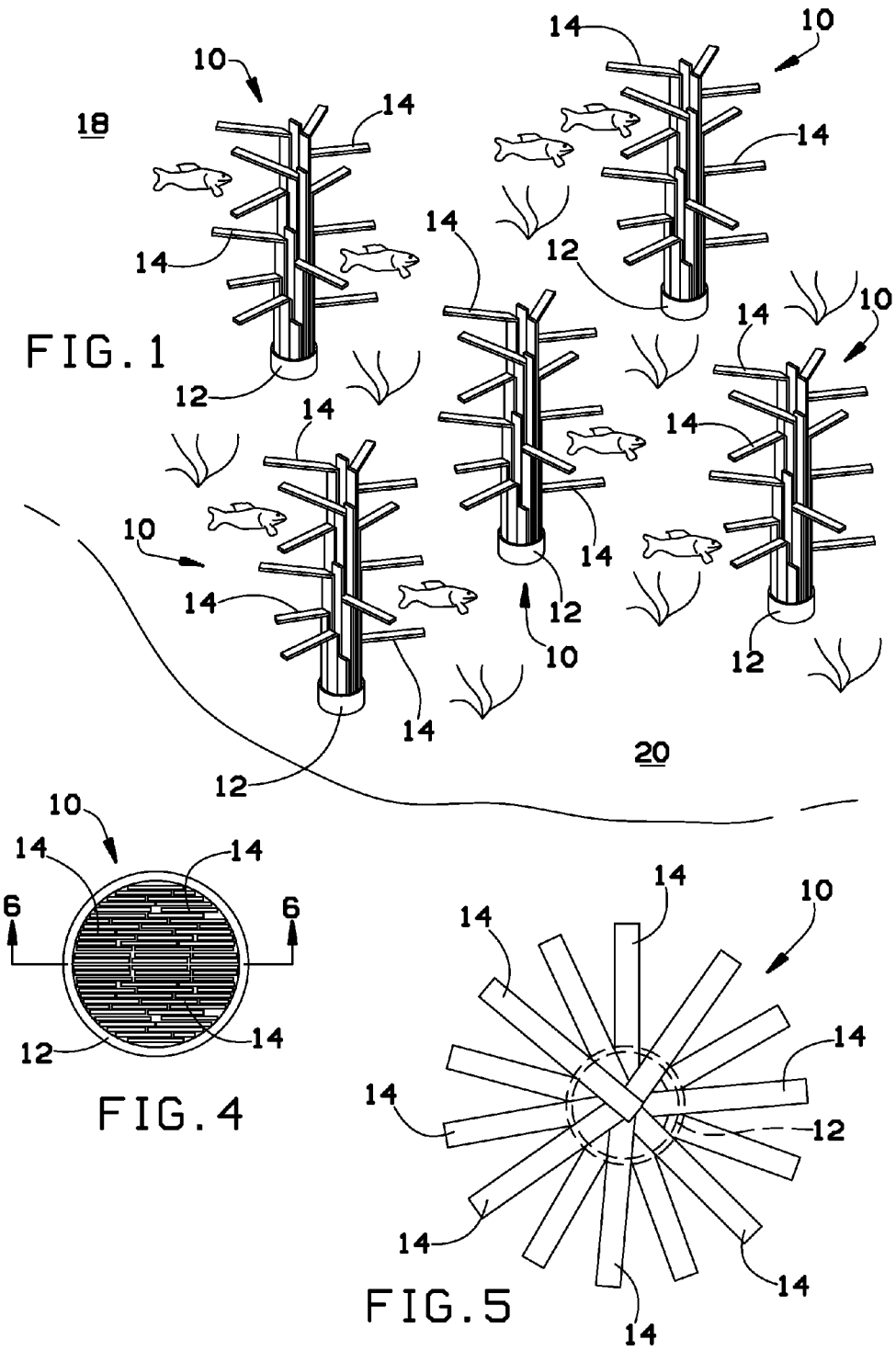

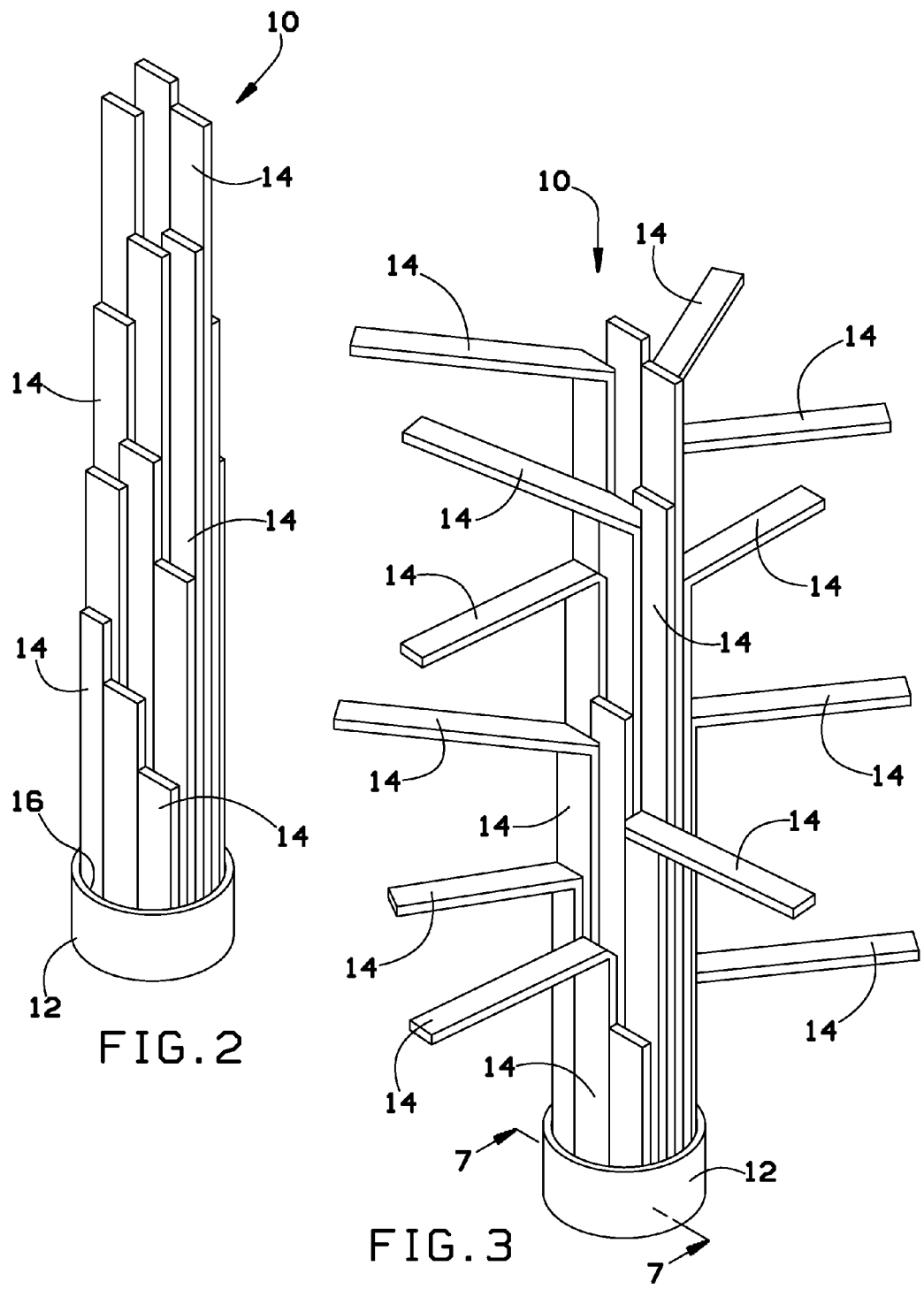

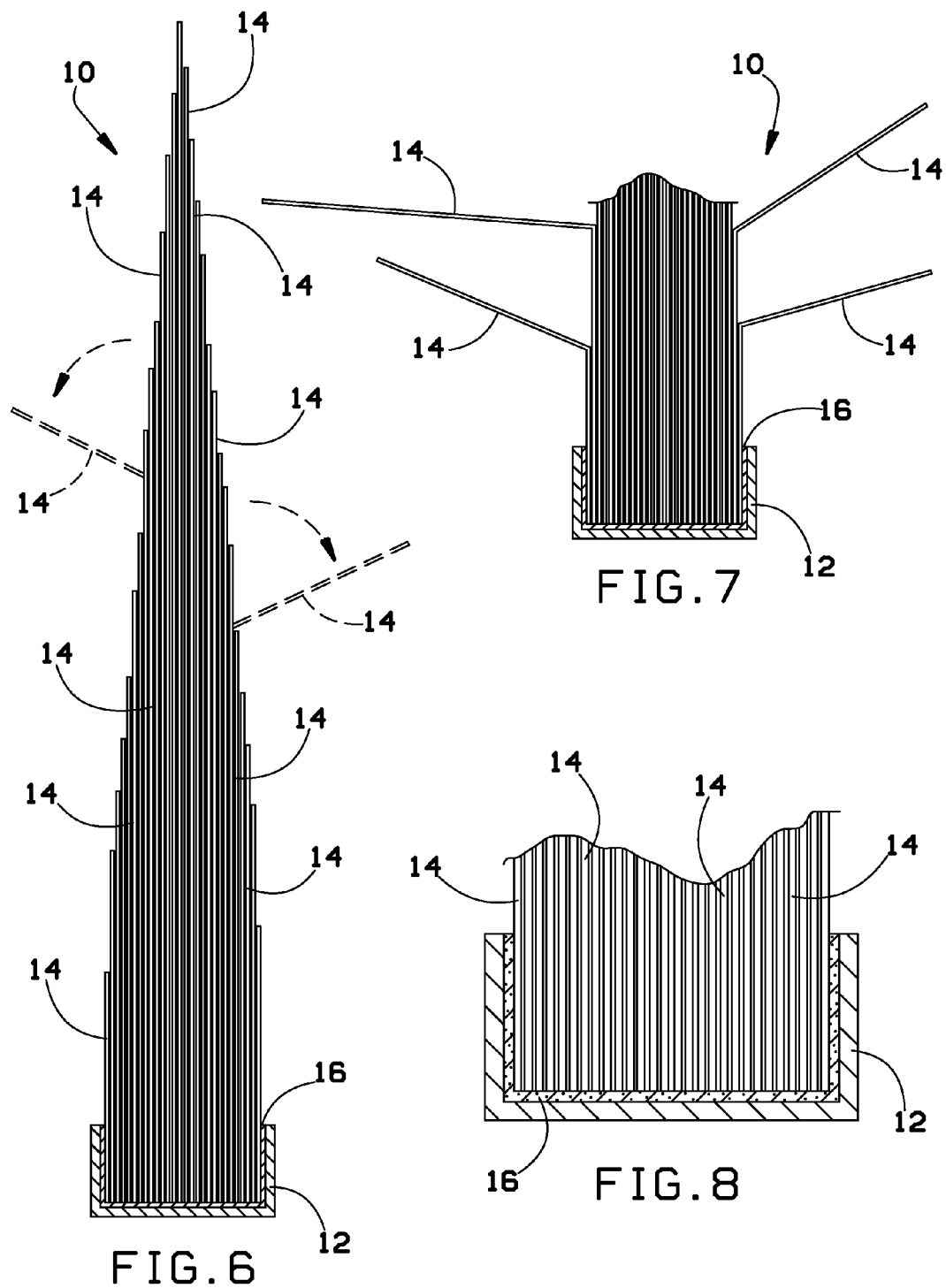

ARTIFICIAL FISH HABITAT EMPLOYING FISH HIDING UNITS

BACKGROUND OF THE INVENTION

The present invention generally relates to fish habitat, and more particularly to an artificial fish habitat employing groups of fish hiding units.

Fish and their prey need underwater cover to thrive and reproduce. Currently, many different products are manufactured to provide additional artificial marine habitats. Some decay too fast, some heavy to install, and most are manufactured from raw material, all of which add up to increased costs.

As can be seen, there is a need and duty to reclaim post-consumer products that are destined for landfills, to offer a more environmentally friendly and cost effective artificial fish habitat.

SUMMARY OF THE INVENTION

In one aspect of the present invention, a fish hiding unit comprises a sinkable container comprising at least one open end; a plurality of elongated and substantially flat projection members comprising a body and opposing ends inserted at one end into the open end of the container; and an adhesive substance disposed in the container for attaching the projection members inside the container.

In another aspect of the present invention, an artificial fish habitat comprises a plurality of sinkable fish hiding units installed in one or more groups at a bottom surface of a body of water, the fish hiding units comprising: a plurality of elongated and substantially flat projection members bent at one or more locations to project at different heights and at different directions and inserted at one end into a container with an adhesive substance.

These and other features, aspects and advantages of the present invention will become better understood with reference to the following drawings, description and claims.

BRIEF DESCRIPTION OF THE DRAWINGS

FIG. 1 shows a perspective view of an embodiment of the fish hiding unit of the present invention shown in its environment;

FIG. 2 shows a perspective view of an embodiment of the present invention shown with the projection members in the un-folded position;

FIG. 3 shows a perspective view of an embodiment of the present invention shown with the projection members in the folded position;

FIG. 4 shows a top view of an embodiment of the present invention shown with the projection members in the un-folded position;

FIG. 5 shows a top view of an embodiment of the present invention shown with the projection members in the folded position;

FIG. 6 shows a section view of an embodiment of the present invention taken along line 6-6 in FIG. 4;

FIG. 7 shows a section view of an embodiment of the present invention taken along line 7-7 in FIG. 3;

FIG. 8 shows a detail section view of an embodiment of the present invention illustrating the container;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide an artificial fish habitat employing fish hiding units. A plurality of fish hiding units may be placed as one or more groups on the bottom surface of a body of water, such as a lake, river, ocean, pond, or the like. Exemplary applications of utilizing the artificial fish habitats of the present invention include restoration of fish and marine life habitats that are at risk of loss or degradation in a cost effective and environmentally friendly and effective way. The present invention can utilize various types of reclaimed materials resulting in lower costs and provides superior shade than other products currently used. By using reclaimed material to make these artificial fish habitats, the natural fish habitats that have been lost or are in need of improvement can be replenished as well as keeping safe discarded materials from going to landfills by reusing them again to benefit humans and nature in general.

Figure 9:
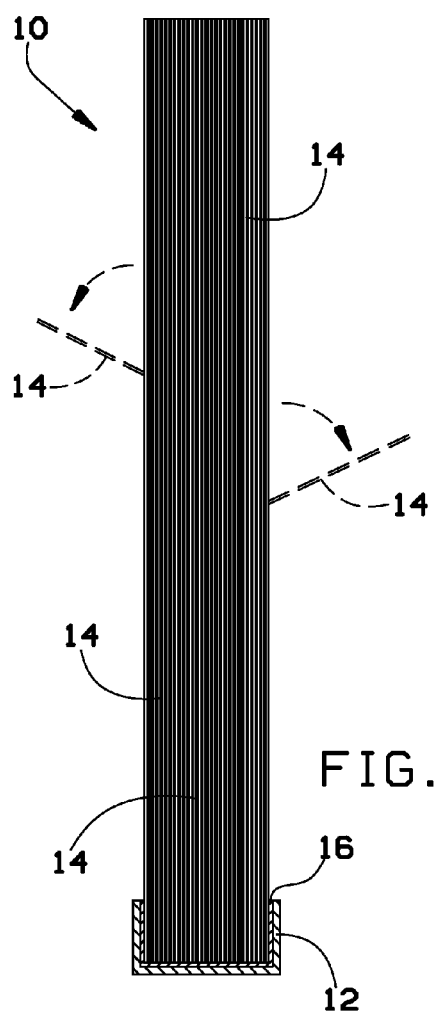
FIG. 9 shows a section view of an embodiment of the present invention illustrating the projection members with one constant length.
Figure 11:
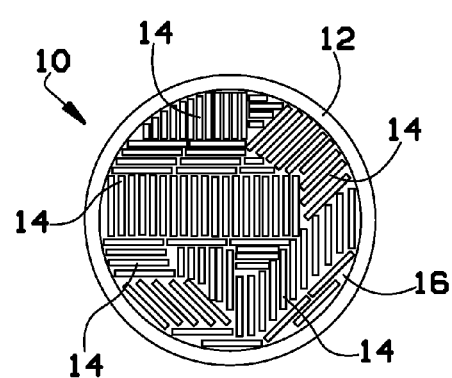
FIG. 11 shows a top view of an embodiment of the present invention as shown in FIG. 10.
Figure 10:
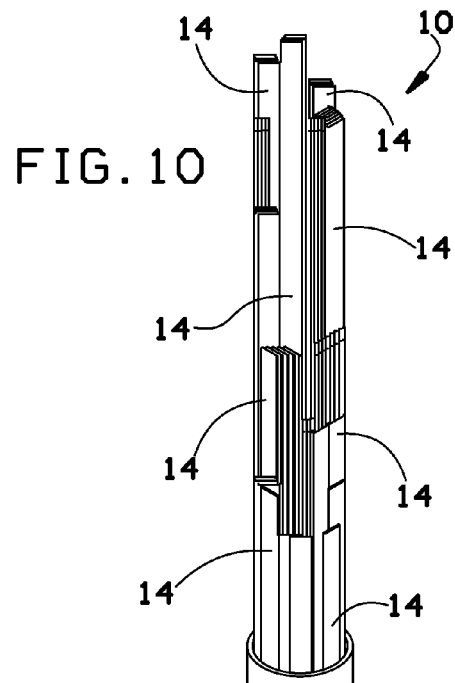
FIG. 10 shows a perspective view of an embodiment of the present invention illustrating the projection members attached into the upright container in random orientations.
Figure 12:
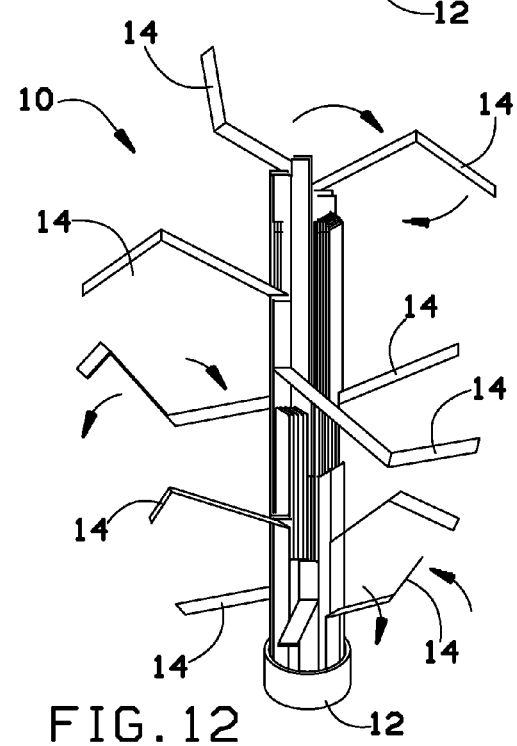
FIG. 12 shows a perspective view of an embodiment of the present invention illustrating the projection members bent at multiple angles.

Referring to FIGS. 1 through 12, exemplary embodiments of the fish hiding unit 10 may be illustrated in general according to the following description. The fish hiding unit 10 may be comprised of a sinkable container 12 having at least one open end and may include an opposing closed end. A plurality of elongated and substantially flat projection members 14 having a body and opposing ends may be inserted at one end into the open end of the container 12. Also, an adhesive substance 16 may be disposed in the container 12 in order to attach the projection members 14 inside the container 12.

The containers 12 are used to hold the adhesive substance 16, such as cement, and protect the cement from damage during shipping, as well as weigh the device down underwater. The projection members 14, such as vinyl siding can also sink under water, further keeping the fish hiding unit 10 on the bottom. The adhesive substance 16 holds the individual projection members 14 in place acting as an anchor. Once dry, the structure stands upright on its own. After assembly and transport, the end user bends the individual projection members 14 at all random angles and lengths and tosses the entire unit in a body of water such as a lake. After settling on the bottom of the body of water, the projection members 14 begin to grow algae and provide shade and cover like a "bush". Over time, more algae and weeds grow providing habitat for juvenile fish which also brings larger fish to prey on them. The idea of creating artificial fish habitats for fish management has been used for many years by Federal and State agencies. However, using artificial reclaimed products to restore lost fish habitat of this type has never been done and is the most ecologically friendly process as well as the most cost effective way.

The size and diameter of the generally round container 12 can be directly related to how height the projection members 12, which can be varied as desired or suited. In an exemplary embodiment, a ten inch diameter container 12 with twenty five projection members 14 made from vinyl siding can be cut to a height of forty eight inches, which can hold its upright position well under water without moving due to current, wind, and wave action. This embodiment can weigh less than twenty five pounds, be very cost effective to ship, and allow ease of handling and installation for consumers. The projection members 14 may include any type bends or twists in any direction, for example the projection members may be bent in angles ranging from between about 1 degree to about 179 degrees, such as between about 10 degrees to about 100 degrees. In one embodiment, each of projection members 14, such as sidings, can be cut to lengths ranging from about twelve inches to about forty eight inches. Then each of those pieces may be cut or ripped to width sizes ranging from about one and a half inches to about three inches. The number of siding strips used may range from about twenty to about thirty five pieces. Taller models could be made with larger and heavier containers 12 but would need the pieces of siding to be wider to stay rigid. With the larger pieces, more material would be used as well as the need for potentially heavy equipment. These larger undamaged pieces would become a premium resulting in increased cost.

The container 12 of the fish hiding unit 10 of the present invention can be made by utilizing old, used, discarded, damaged, discontinued, blemished, or otherwise reclaimed PVC, plastic, or marine safe material of various sizes can be used. This may include pipes, cans, pails, buckets, or the like. Vinyl sidings of similar reclaimed condition may be cut down to size to make the projection members 14, which can be cemented into one of the reclaimed containers 12, in an upright or vertical orientation. The end user then unfolds the strips of siding before installing in lake, stream, ocean, or other bodies of water where they sink to the bottom.

In one embodiment for creating an artificial fish habitat, "fish cribs" as they are often referred to may be installed by placing groups of ten or more fish hiding units underwater in the desired location. An even larger group of structures creates a more substantial area for fish to begin to use and benefit from. A person installing the fish hiding units 10 can place about twenty five units in a small area such as a rowboat, and take them to the desired location. The person can then begin to unfold and bend the projection members 14 of each fish hiding unit 10 before tossing it in the water. The unit will sink to the bottom of the water and stand upright due to the cement base.

It should be understood, of course, that the foregoing relates to exemplary embodiments of the invention and that modifications may be made without departing from the spirit and scope of the invention as set forth in the following claims.

What is claimed is:

1. A fish hiding unit, comprising:
   a sinkable container comprising at least one open end;
   a plurality of rigid, elongated and substantially flat projection members comprising a body and opposing ends, inserted at one end into the at least one open end of the container; and
   an anchor disposed in the container; wherein the projection members are bent at one or more locations and project at different heights and in different directions configured to hold the projection members upright inside the container.

2. The fish hiding unit of claim 1, wherein the projection members comprise one or more different lengths.

3. The fish hiding unit of claim 1, wherein the container and the projection members are made from reclaimed material.

4. The fish hiding unit of claim 3, wherein the container is selected from the group consisting of marine safe pipes, cans, pails, and buckets.

5. The fish hiding unit of claim 1, wherein the projection members are twisted to project in different directions.

6. The fish hiding unit of claim 1, wherein the anchor comprises cement.

7. The fish hiding unit of claim 1, wherein the projection members are between about 12 inches to about 48 inches tall, between about 1.5 inches to about 3 inches wide, and the number of projection members inserted into the container are between about 30 to about 35.

8. The fish hiding unit of claim 1, wherein the projection members comprise one or more bends with angles between about 1 degree and 179 degrees.

9. An artificial fish habitat, comprising:
   a weighted sinkable container holding a plurality of sinkable elongated substantially flat, and self-supporting projection members each bent at one or more locations at angles between about 10 degrees to about 100 degrees at one or more locations along the length of respective members to project at different heights and at different directions and inserted at one end into a container with an adhesive substance.

* * * * *